No. 895,986. PATENTED AUG. 11, 1908.
T. EASTMAN.
BEET HARVESTING MACHINE.
APPLICATION FILED MAY 9, 1907.
3 SHEETS—SHEET 2.
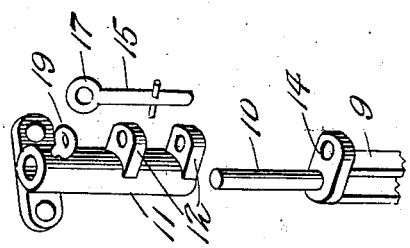
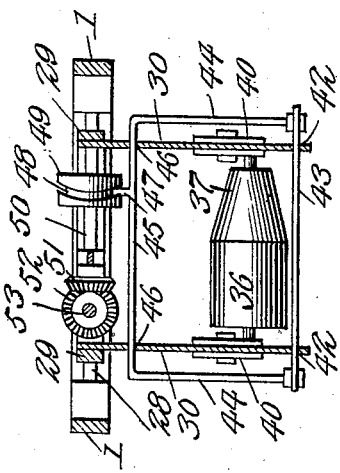
Witnesses
F. C. Ackman Jr.
T. Bungia
Inventor
Thomas Eastman,
By Victor J. Evans
Attorney No. 895,986. PATENTED AUG. 11, 1908.
T. EASTMAN.
BEET HARVESTING MACHINE.
APPLICATION FILED MAY 9, 1907.
3 SHEETS—SHEET 3.
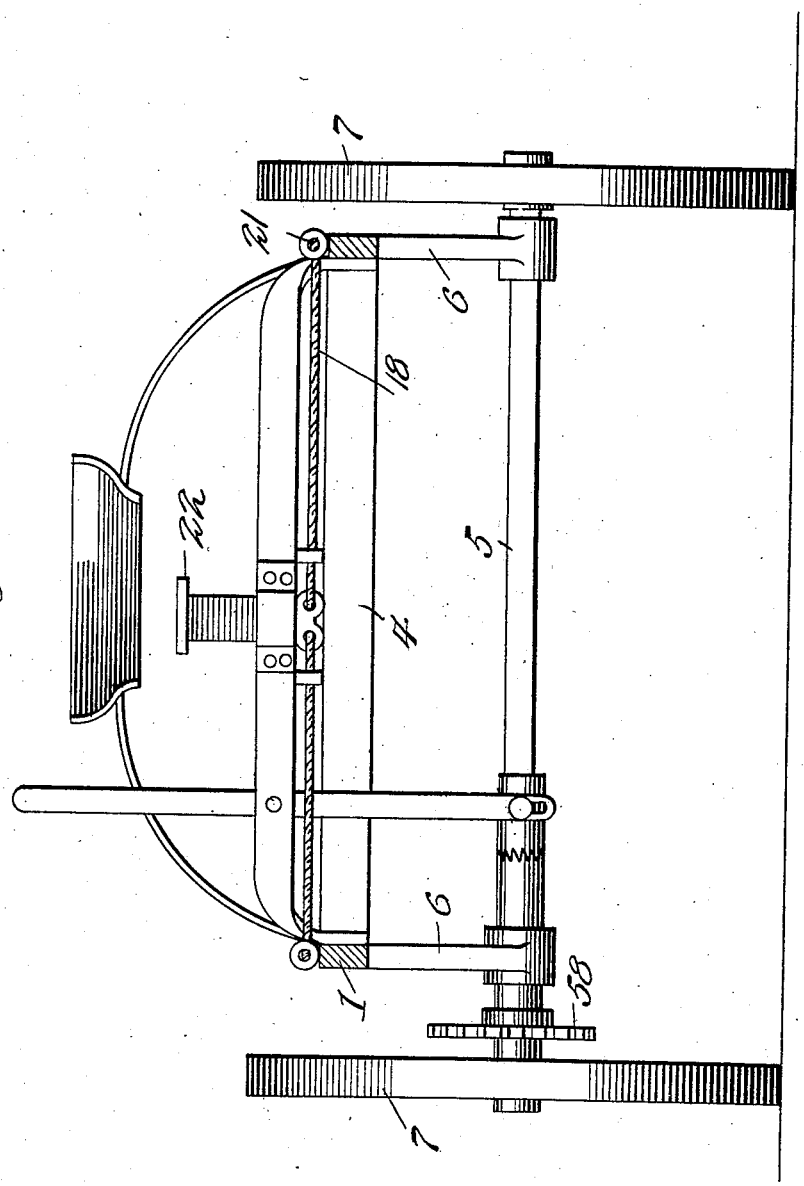
Witnesses
Inventor
Thomas Eastman
By Victor J. Evans
Attorney

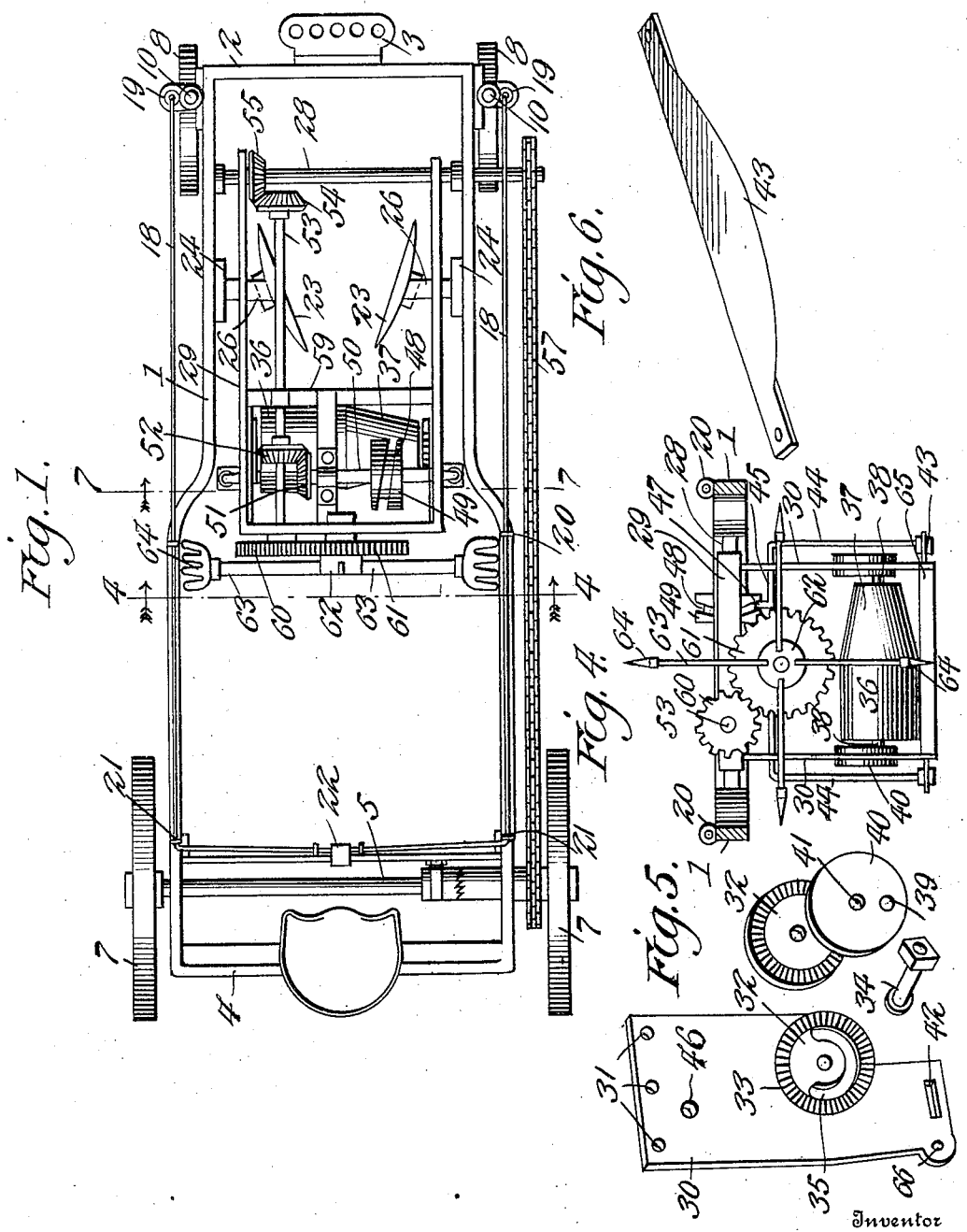

UNITED STATES PATENT OFFICE.

THOMAS EASTMAN, OF ROCKY FORD, COLORADO, ASSIGNOR OF ONE-HALF TO WILLIAM P. OSBORN, OF ROCKY FORD, COLORADO.

BEET-HARVESTING MACHINE.

No. 895,986.  Specification of Letters Patent.  Patented Aug. 11, 1908.

Application filed May 9, 1907. Serial No. 372,657.

*To all whom it may concern:*

Be it known that I, THOMAS EASTMAN, a citizen of the United States of America, residing at Rocky Ford, in the county of Otero and State of Colorado, have invented new and useful Improvements in Beet-Harvesting Machines, of which the following is a specification.

This invention relates to machines for harvesting sugar beets, and one of the principal objects of the same is to provide a machine of comparatively simple construction which will efficiently operate to cut the tops from the beets preparatory to digging the same.

Another object of the invention is to provide a swinging frame for carrying a reciprocating cutter, and an adjustable roller by means of which the cutter may be regulated to cut the top at a greater or lesser distance from the ground.

Still another object of the invention is to provide means for cutting the tops from the beets and throwing said tops out at one side of the machine.

These and other objects may be attained by means of the construction illustrated in the accompanying drawings, in which:—

Figure 1 is a plan view of a beet harvesting machine made in accordance with my invention. Fig. 2 is a side elevation of the same in which the main axle is shown in section, and one of the driving wheels removed. Fig. 3 is a transverse vertical sectional view on the line 3—3 of Fig. 2, looking in the direction indicated by the arrows. Fig. 4 is a similar view on the line 4—4 of Fig. 1, looking in the direction indicated by the arrow. Fig. 5 is a detail perspective view showing the means for adjusting the bearing roller vertically. Fig. 6 is a detail perspective view of the cutter. Fig. 7 is a transverse vertical section on the line 7—7, Fig. 1, looking in the direction indicated by the arrow. Fig. 8 is a detail perspective view showing the manner of mounting the pilot wheels Referring to the drawings for a more particular description of my invention, the numeral 1 designates the main frame of the machine which is of substantially rectangular formation and provided with a front cross bar 2 to which a clevis 3 of suitable construction is attached, and a rear cross bar 4. The main axle 5 is journaled in hangers 6 depending from the side bars of the frame 1, and 7 are the wheels mounted on said axle.

Near the front end of the machine a pair of pilot wheels 8 are mounted upon hangers 9, and the upper ends of said hangers are each provided with a spindle 10 journaled in a sleeve 11 provided with perforated lugs 12, said sleeve being secured by means of bolts 13 to the frame bars 1. Formed on the hanger 9 is a perforated lug 14. A pin 15 extends through the perforations in the lugs 12 and through the perforation in the lug 14, a spring 16 surrounding the pin between the lugs 12 to normally hold the pin into engagement with the lugs 12 and 14, and thus hold the pilot wheels in parallel relation. The upper ends of the pins 15 are provided each with an eye 17, and connected to these eyes is a cord 18, said cord passing through an eye 19 on the sleeve 11, and extending backward through guide eyes 20 and 21 to a suitable push bar 22 which may be operated by the foot of the driver to withdraw the pins from the lugs 12 and 14 to permit the wheels 8 to turn upon the spindles 10 when it is desired to turn the machine at the ends of the rows.

A pair of concavo-convex cultivator disks 23 are mounted in hangers 24 provided with slots 25 for permitting the vertical adjustment of the disks upon the bolts 26, said hangers 24 being secured by means of bolts 27 to the side bars 1 of the machine. An axle 28 is journaled in the side bars 1 of the frame, and a cutter frame 29 is loosely mounted at its front end upon the axle 28, the rear end of said frame being permitted to freely rise and fall. Connected near the rear end of the frame 29 are vertically disposed side plates 30, said plates having a series of bolt holes 31 therein through which the bolts pass for securing said plates to the frame 29. Ratchet disks 32 provided with ratchet teeth 33 are bolted to both sides of the plates 30 by means of a central bolt 34, said ratchet disks being provided with arcuate slots 35 which register with similar slots formed in the plates 30.

A roller 36 provided with a frusto-conical end 37 is provided with projecting spindles 38 journaled in an eccentric aperture 39 in a ratchet disk 40 provided with a central hole 41 through which the bolt 34 passes to secure the ratchet disk 40 against the ratchet 32, thus providing means for adjusting the roller 36 vertically and horizontally for a purpose which will presently appear.

It will be understood that a ratchet disk 32 is secured on both sides of the plate 30, said ratchet disks being of substantially identical formation. A slot 42 is formed in the lower ends of the plates 30, and mounted to reciprocate in these slots is a cutter 43 supported in the lower ends of a frame 44 provided with an upper cross bar 45 journaled in openings 46 in the plates 30, said cross bar having a cam projection 47 engaged by a groove 48 in a cam wheel 49 mounted on a shaft 50 journaled in the frame 29, said shaft carrying a bevel gear wheel 51 which meshes with a similar gear 52 mounted on a shaft 53 journaled in the frame 29 and carrying at its front end a bevel gear 54 which engages a similar bevel gear 55 on the shaft 28. The shaft 28 is rotated by means of a sprocket wheel 56, and a chain 57 passes around said sprocket wheel and around a sprocket wheel 58 on the main axle 5. The shaft 53 is journaled in a cross bar 59 and the rear end of said shaft carries a crown gear wheel 60 which meshes with a similar gear 61 having a stub axle mounted in the frame 29, said axle having a sleeve 62 mounted thereon, said sleeve carrying a series of flexible arms 63 carrying fingers 64 at their outer ends, the purpose of which is to throw the cut tops of the beets to one side of the machine as it passes over the rows, the tops being cut from the beets while in the ground by means of the cutter 43. A bearing roller 65 is journaled at its ends in openings 66 in the plate 30, and the weight of the cutter frame 29 is sustained upon this roller, which rises and falls as it passes over the hills and holds the cutter and the roller 36 in proper position to cut the tops from the beets, the roller serving to bend the tops down, while the reciprocating cutter cuts them off at a point immediately above the top of the beet.

The operation of my invention may be briefly described as follows: As the machine is drawn over the field in line with a row of beets, the disks 23 remove the weeds and form furrows upon opposite sides of the row. The roller 36 bends the tops of the beets down, and the reciprocating cutter 43 severs the tops from the beets while they are in the ground, and the flexible arms 63 being rotated the fingers 64 engage the tops and sweep them to one side. The bearing roller 65 serves to support the cutter frame and to permit the same to rise and fall as it passes over beets which project from the ground so that the knife will not sever the upper portion of the beet.

From the foregoing it will be obvious that a machine made in accordance with my invention will operate efficiently to cut the tops from the beets, remove the tops, and deposit them at the side of the machine.

Having thus described the invention, what I claim is:

1. In a machine of the character described, the combination of a frame mounted upon wheels, a cutter frame pivotally connected thereto, a roller for supporting said frame, a reciprocating cutter mounted to reciprocate in said frame, means for reciprocating said cutter, and a roller for bending the tops of the beets, said roller being adjustably mounted in said frame.

2. In a machine of the character described, a cutter frame, a reciprocating cutter, a roller mounted in the cutter frame, said roller having a frusto-conical end, a bearing roller mounted in the frame, flexible arms carrying fingers at their ends, and means for rotating said arms to remove the cut tops to the side of the machine.

3. In a machine of the character described, the combination of a frame, a cutter frame pivoted thereto, a roller mounted in said frame for bending down the tops of the beets, a reciprocating cutter mounted in said frame, means for reciprocating said cutter, a bearing roller for sustaining the weight of said cutter frame, flexible arms, and means for rotating the same for removing the cut tops.

4. In a machine of the character described, the combination of a frame mounted on wheels, a cutter frame pivoted thereto, a cutter mounted in said frame, means for reciprocating said cutter, a bearing roller journaled in the frame for sustaining the weight of the frame, a roller journaled in said frame for bending over the tops of the beets, said roller being adjustable in the arc of a circle relatively to the reciprocating cutter.

5. In a machine of the character described, a cutter frame, a cutter mounted to reciprocate therein, means for reciprocating said cutter, a roller mounted in the cutter frame, ratchet disks for adjusting said roller in the arc of a circle relatively to said cutter, and a series of flexible arms for removing the cut tops of the beets.

In testimony whereof, I affix my signature in presence of two witnesses.

THOMAS EASTMAN.

Witnesses:
  SAIDEE STEEN,
  G. H. WINCHELL.